United States Patent
Pariza et al.

(10) Patent No.: US 10,267,360 B2
(45) Date of Patent: Apr. 23, 2019

(54) PNEUMATIC BEARING WITH BONDED POLYMER FILM WEAR SURFACE AND PRODUCTION METHOD THEREOF

(75) Inventors: Dragos Pariza, Stamford, CT (US); Santiago E. Del Puerto, Milton, NY (US)

(73) Assignee: ASML Holding N.V., Veldhoven (NL)

( * ) Notice: Subject to any disclaimer, the term of this patent is extended or adjusted under 35 U.S.C. 154(b) by 1592 days.

(21) Appl. No.: 13/700,369

(22) PCT Filed: Apr. 6, 2011

(86) PCT No.: PCT/EP2011/055378
§ 371 (c)(1),
(2), (4) Date: Nov. 27, 2012

(87) PCT Pub. No.: WO2011/160867
PCT Pub. Date: Dec. 29, 2011

(65) Prior Publication Data
US 2013/0108203 A1 May 2, 2013

Related U.S. Application Data

(60) Provisional application No. 61/357,771, filed on Jun. 23, 2010.

(51) Int. Cl.
*F16C 33/02* (2006.01)
*B32B 27/28* (2006.01)
(Continued)

(52) U.S. Cl.
CPC ............. *F16C 33/02* (2013.01); *B32B 9/005* (2013.01); *B32B 9/045* (2013.01); *B32B 15/08* (2013.01);
(Continued)

(58) Field of Classification Search
CPC ... B32B 27/28; B32B 2457/08; B32B 27/281; D01H 4/12; F16C 33/02; F16C 33/201;
(Continued)

(56) References Cited

U.S. PATENT DOCUMENTS 6,296,990 B1 10/2001 Kwan
6,632,314 B1 * 10/2003 Yu ..................... H01L 21/4857
156/241

(Continued)

FOREIGN PATENT DOCUMENTS

CN 1035871 A 9/1989
CN 1300908 A 6/2001
(Continued)

OTHER PUBLICATIONS

Epoxy Technology, retrieved Feb. 20, 2016.*
(Continued)

*Primary Examiner* — Callie E Shosho
*Assistant Examiner* — Krupa Shukla
(74) *Attorney, Agent, or Firm* — Sterne, Kessler, Goldstein & Fox P.L.L.C.

(57) ABSTRACT

Disclosed are pneumatic bearings with a bonded polymer film wear surface and production methods thereof. For example, a pneumatic bearing for supporting a payload is disclosed. The pneumatic bearing has a bearing surface having a polyimide film fastened to a substrate with a bonding layer. The polyimide film can comprise polyoxydiphenylene-pyromellitimide and the bonding layer can comprise diglycidyl ether of bisphenol A, 1,4-butanediol diglycidyl ether, and 2,2,4-trimetylhexametylen-1,6-diamin.

6 Claims, 7 Drawing Sheets

(51) Int. Cl.
*F16C 33/20* (2006.01)
*F16C 43/02* (2006.01)
*B32B 9/00* (2006.01)
*B32B 9/04* (2006.01)
*B32B 15/08* (2006.01)
*B32B 15/18* (2006.01)
*B32B 27/08* (2006.01)
*B32B 27/38* (2006.01)

(52) U.S. Cl.
CPC .............. *B32B 15/18* (2013.01); *B32B 27/08* (2013.01); *B32B 27/28* (2013.01); *B32B 27/281* (2013.01); *B32B 27/38* (2013.01); *F16C 33/201* (2013.01); *F16C 43/02* (2013.01); *B32B 2307/536* (2013.01); *B32B 2307/558* (2013.01); *B32B 2307/732* (2013.01); *B32B 2457/08* (2013.01); *Y10T 156/1052* (2015.01)

(58) Field of Classification Search
CPC ........ F16C 43/02; F16C 32/06; F16C 13/006; F16C 33/206; F16C 2340/18; F16C 32/0692; F16C 32/0685; Y10T 156/1052; Y10T 156/10; Y10T 403/25; F04D 13/0633; F04D 29/0413; F04D 29/047
USPC ........ 156/250, 330; 384/625, 121, 100, 107, 384/279, 420, 549, 907.1; 415/104, 415/216.1, 229; 403/34
See application file for complete search history.

(56) References Cited

U.S. PATENT DOCUMENTS

| | | | |
|---|---|---|---|
| 7,678,458 | B2 | 3/2010 | Lipson et al. |
| 2002/0007111 | A1* | 1/2002 | Deckert .............. G02B 23/2407 600/177 |
| 2002/0054717 | A1 | 5/2002 | Zywno |
| 2004/0057780 | A1* | 3/2004 | Farbaniec .............. F16C 13/006 403/34 |
| 2005/0168076 | A1 | 8/2005 | Hazelton |
| 2006/0078239 | A1 | 4/2006 | Dimofte |
| 2006/0124864 | A1 | 6/2006 | Sogard |

FOREIGN PATENT DOCUMENTS

| | | | | |
|---|---|---|---|---|
| CN | 101131178 | A | | 2/2008 |
| CN | 101303531 | A | * | 11/2008 .............. G03F 7/707 |
| CN | 101408224 | A | * | 4/2009 ............ F16C 33/201 |
| EP | 2 048 391 | A2 | | 4/2009 |
| JP | 02-057721 | A | | 2/1990 |
| JP | 02-212624 | A | | 8/1990 |
| JP | 09-144757 | A | | 6/1997 |
| JP | 09-329133 | A | | 12/1997 |
| JP | 11-303871 | A | | 11/1999 |
| JP | 2000027869 | A | * | 1/2000 |
| JP | 2002-178341 | A | | 6/2002 |
| JP | 2002-265912 | A | | 9/2002 |
| JP | 2006-207646 | A | | 8/2006 |

OTHER PUBLICATIONS

DuPont, Kapton VN polyimide film, 2006.*
International Search Report directed to related International Patent Application No. PCT/EP2011/055378, dated Sep. 1, 2011, from the European Patent Office; 2 pages.
International Preliminary Report on Patentability and Written Opinion of the International Searching Authority directed to related International Patent Application No. PCT/EP2011/055378, dated Dec. 28, 2012, from the International Bureau of WIPO; 4 pages.
"Dupont™ Vespel® Motion Solutions: Linear Motion Solutions in Unlubricated Service Using Dupont™ Vespel® SP and SCP," accessed at http://www2.dupont.com/Vespel/en_US/assets/downloads/vespel_s/K16840MotionMetric.pdf, copyright 2007; 2 pages.

* cited by examiner

PNEUMATIC BEARING WITH BONDED POLYMER FILM WEAR SURFACE AND PRODUCTION METHOD THEREOF

CROSS-REFERENCE TO RELATED APPLICATIONS

This application claims the benefit of U.S. provisional application 61/357,771 which was filed on 23 Jun. 2010, and which is incorporated herein in its entirety by reference.

BACKGROUND

Field of the Invention

The present invention generally relates to lithography, and more particularly to a pneumatic bearing.

Background Art

Lithography is widely recognized as a key process in manufacturing integrated circuits (ICs), as well as other devices and structures. A lithographic apparatus is a machine, used during lithography, which applies a pattern onto a substrate, such as onto a target portion of the substrate. During manufacture of ICs with a lithographic apparatus, a patterning device (which is alternatively referred to as a mask or a reticle) generates a circuit pattern to be formed on an individual layer in an IC. This pattern can be transferred onto the target portion (e.g., comprising part of, one or several dies) on the substrate (e.g., a silicon wafer). Transfer of the pattern is typically via imaging onto a layer of radiation-sensitive material (e.g., resist) provided on the substrate. In general, a single substrate contains a network of adjacent target portions that are successively patterned. Manufacturing different layers of the IC often requires imaging different patterns on different layers with different reticles. Therefore, reticles and substrates must be changed during the lithographic process. To facilitate reticle handling, stages that support reticles are provided with pneumatic bearings.

A bearing is a device that reduces friction between moving parts, and/or supports moving loads. There are two main types of bearings. An anti-friction bearing minimizes friction using devices such as roller bearings or ball bearings. The friction bearing minimizes friction using active lubrication or other means to facilitate motion between moving parts. Friction bearings are also known as sliding bearings. Many bearing assemblies take advantage of both principles—e.g., a lubricated ball bearing assembly.

A pneumatic bearing is an example of a friction or sliding bearing. It uses compressed gas to create a consistent gas film upon which a bearing surface rests and moves. The gas film acts as a virtually frictionless lubricant that facilitates smooth motion between the surfaces of the pneumatic bearing. The bearing surface upon which the lubricating gas film is generated is called the "active surface." Typically, pneumatic bearings require at least a steady source of compressed gas to maintain the lubricating gas film.

As introduced above, an exemplary environment for pneumatic bearings is in the semiconductor lithography field. There, pneumatic bearings provide a number of advantages. Pneumatic bearings are virtually frictionless, and therefore produce no particulate wear materials as they operate. Such particulate matter would be troublesome in the ultra-clean semiconductor manufacturing environment. Additionally, lubricants present in ball or roller bearings could outgas contaminant molecules, which are also detrimental in semiconductor manufacturing environments. Pneumatic bearings also require relatively little maintenance or regular repair.

Despite all of these benefits, incidental "dry" contact between pneumatic bearing surfaces can occur during use, scratching conventional pneumatic bearing surfaces and compromising their performance. To combat this problem, conventional bearings ride on guideways of polished granite or chrome-plated steel, while the bearings themselves are fabricated with case-hardened stainless steel. The case-hardening process provides wear resistance, corrosion resistance, and resistance to galling by hardening a skin layer of the steel. The bulk of the steel remains unhardened, thus the hardness is maximum at the surface, and drops off rapidly and continuously through the thickness of the skin layer as a direct function of distance from the surface. Unfortunately, the case-hardening process also slightly deforms the bearing, requiring the bearing to be reground, which partially and somewhat unevenly removes the hardened layer. The final product is a functional, flat bearing, however the thickness of the hardened skin layer is not uniform across the bearing surface, and also varies from bearing to bearing, depending on the depth of grinding that was required to regain flatness. In a practical sense, the hardness of the bearing cannot be tightly controlled with the case-hardening process.

Non-uniformity of the hardened skin layer is aggravated in the case of differential seal bearings used in lithographic reticle handler modules, which are an order of magnitude larger than stage bearings, and are made from thin steel plates. Thin steel plates tend to permanently deform with any treatment that requires heating the part, including the case-hardening process. In a vacuum environment, case-hardened steel provides good resistance to galling, does not generate excessive amounts of particles, and is relatively inexpensive. Therefore, it has conventionally been the surface treatment of choice.

Improvements in pneumatic bearing design are constantly needed. This is especially true in the semiconductor lithography tool arts, where manufacturing tools are constantly pushed to more precise tolerances and faster speeds.

SUMMARY

Given the foregoing, what is needed is a method for creating a pneumatic bearing surface that is vacuum-compatible and can operate without any lubrication when there is no gas input to the bearing, including dry sliding. In addition, what is needed are pneumatic bearing surfaces that generate very few, if any, particles under such conditions, in order to avoid contamination of a vacuum chamber. The improved pneumatic bearing should also be low-cost. To meet these needs, embodiments of the present invention are directed to a pneumatic bearing with a bonded polymer film wear surface and a production method thereof.

For example, an embodiment of the present invention provides a pneumatic bearing having a bearing surface including a substrate, a bonding layer disposed on the substrate, and a polyimide film disposed on the bonding layer. The substrate can be a ceramic material and the bonding layer can comprise diglycidyl ether of bisphenol A, 1,4-butanediol diglycidyl ether, and 2,2,4-trimetylhexam-etylen-1,6-diamin. The polyimide film comprises poly-oxy-diphenylene-pyromellitimide, and can be in a range of about 7-100 microns, and preferably at least 25 microns thick. The pneumatic bearing can be used in a lithographic apparatus.

In a further example, an embodiment of the present invention provides a method for manufacturing a bearing surface of a pneumatic bearing. The method can include disposing a polyimide film on a flat surface of a vacuum chuck, applying a vacuum to the polyimide film, and disposing a liquid epoxy on a surface of the polyimide film. A substrate can be disposed onto the liquid epoxy without contacting the polyimide film with the substrate. The substrate is released onto the liquid epoxy and a weight is disposed onto the substrate. The liquid epoxy is cured and the weight is removed. The polyimide film is released from the vacuum chuck. The polyamide film can be trimmed to match the contour of the substrate.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention. Together with the description, they further serve to explain the principles of the invention and to enable a person skilled in the relevant art(s) to make and use the invention.

FIGS. 1A and 1B respectively depict reflective and transmissive lithographic apparatuses.

Figure 1A:
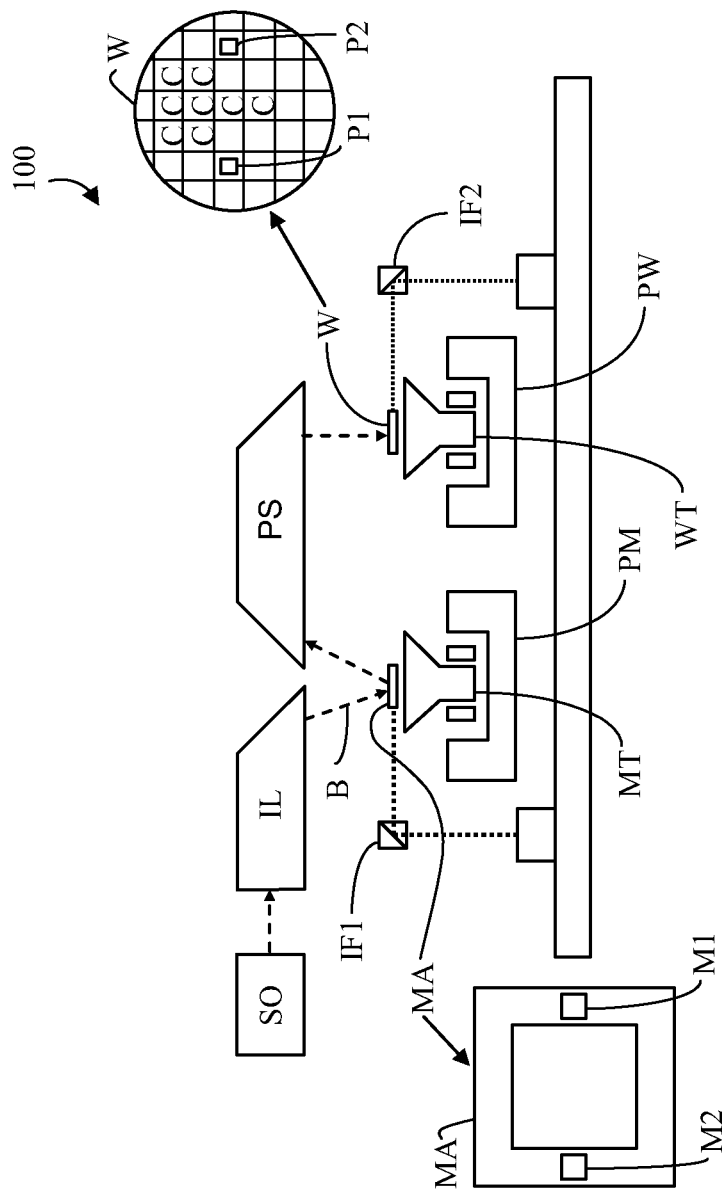

The figures herein are not necessarily drawn to scale. The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Overview

The present invention is directed to a bonded polymer film wear surface and production method thereof. This specification discloses one or more embodiments that incorporate the features of this invention. The disclosed embodiment(s) merely exemplify the invention. The scope of the invention is not limited to the disclosed embodiment(s). The invention is defined by the claims appended hereto.

This description is provided in the context of the semiconductor lithography arts. This environment was chosen to best illustrate certain features of the present invention. The environment, however, should not be construed as limiting the invention beyond those features recited in the appended claims. One of skill in the art could, of course, envision numerous uses for a pneumatic bearing having the features described herein, outside the semiconductor lithography tool context.

The embodiment(s) described, and references in the specification to "one embodiment", "an embodiment", "an example embodiment", etc., indicate that the embodiment(s) described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Disclosed are a pneumatic bearing with a bonded polymer film wear surface and methods for its production. For example, a pneumatic bearing for supporting a payload is disclosed. The pneumatic bearing has a bearing surface having a polyimide film fastened to a substrate with a bonding layer. In an embodiment, the polyimide film comprises poly-oxydiphenylene-pyromellitimide, and the bonding layer comprises diglycidyl ether of bisphenol A; 1,4-butanediol diglycidyl ether; and 2,2,4-trimetylhexametylen-1,6-diamin. The bearing surface is vacuum compatible and can operate without any lubrication when there is no gas input to the bearing, including dry sliding. In addition, the bearing surface generates very few particles under dry sliding conditions, in order to avoid contamination of the chamber. This solution is also low-cost when compared to conventional air bearings.

Embodiments of the invention enable replication of a useful, very flat tooling surface using inexpensive materials and a simple process. High performance, robustness, and durability are achieved, while expensive precision grinding and heat treatment steps are avoided. As an additional benefit, metal-to-metal galling in a vacuum environment is eliminated.

Before describing these and other embodiments in more detail, however, it is instructive to present an example environment in which embodiments of the present invention can be implemented.

II. An Example Lithographic Environment

A. Example Reflective and Transmissive Lithographic Systems

Figure 1B:
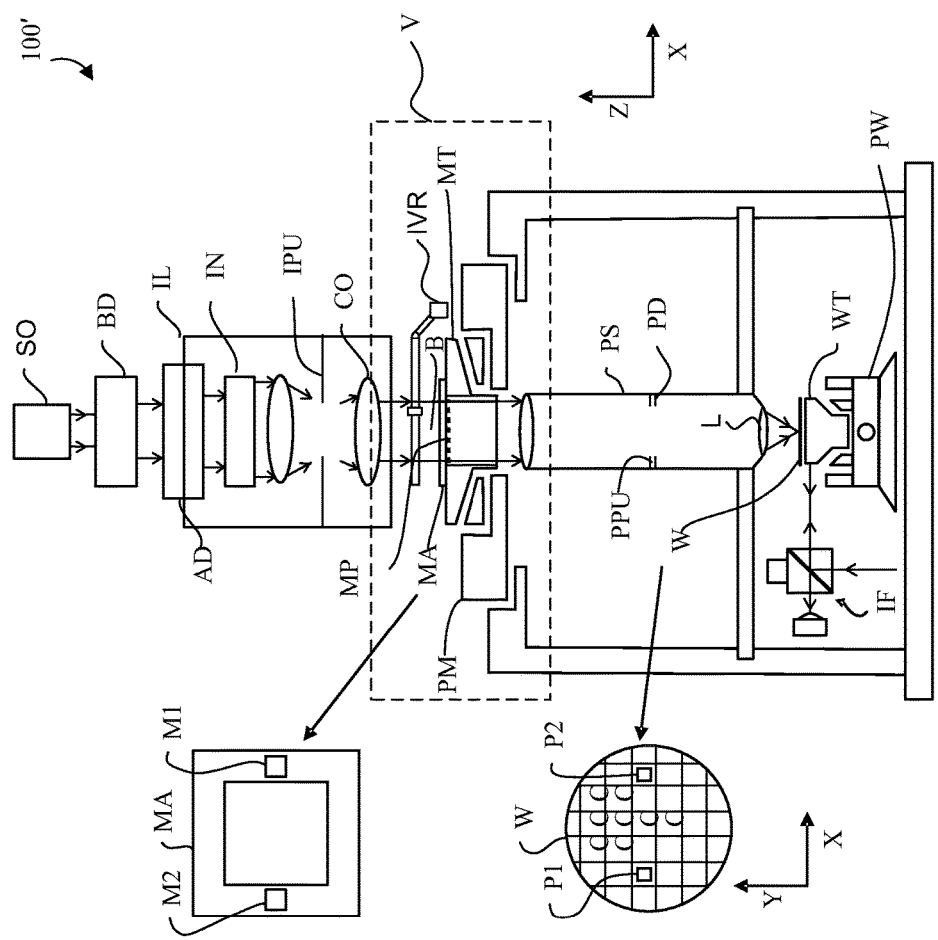

FIGS. 1A and 1B schematically depict lithographic apparatus 100 and lithographic apparatus 100', respectively. Lithographic apparatus 100 and lithographic apparatus 100' each include: an illumination system (illuminator) IL configured to condition a radiation beam B (e.g., DUV or EUV radiation); a support structure (e.g., a mask table) MT configured to support a patterning device (e.g., a mask, a reticle, or a dynamic patterning device) MA and connected to a first positioner PM configured to accurately position the patterning device MA; and a substrate table (e.g., a wafer table) WT configured to hold a substrate (e.g., a resist coated wafer) W and connected to a second positioner PW configured to accurately position the substrate W. Lithographic apparatuses 100 and 100' also have a projection system PS configured to project a pattern imparted to the radiation beam B by patterning device MA onto a target portion (e.g., comprising one or more dies) C of the substrate W. In lithographic apparatus 100 the patterning device MA and the projection system PS is reflective, and in lithographic apparatus 100' the patterning device MA and the projection system PS is transmissive.

The illumination system IL can include various types of optical components, such as refractive, reflective, magnetic, electromagnetic, electrostatic or other types of optical components, or any combination thereof, for directing, shaping, or controlling the radiation B.

The support structure MT holds the patterning device MA in a manner that depends on the orientation of the patterning device MA, the design of the lithographic apparatuses 100 and 100', and other conditions, such as for example whether or not the patterning device MA is held in a vacuum environment. The support structure MT can use mechanical, vacuum, electrostatic or other clamping techniques to hold the patterning device MA. The support structure MT can be a frame or a table, for example, which can be fixed or movable, as required. The support structure MT can ensure that the patterning device is at a desired position, for example with respect to the projection system PS.

The term "patterning device" MA should be broadly interpreted as referring to any device that can be used to impart a radiation beam B with a pattern in its cross-section, such as to create a pattern in the target portion C of the substrate W. The pattern imparted to the radiation beam B can correspond to a particular functional layer in a device being created in the target portion C, such as an integrated circuit.

The patterning device MA can be transmissive (as in lithographic apparatus 100' of FIG. 1B) or reflective (as in lithographic apparatus 100 of FIG. 1A). Examples of patterning devices MA include reticles, masks, programmable mirror arrays, and programmable LCD panels. Masks are well known in lithography, and include mask types such as binary, alternating phase shift, and attenuated phase shift, as well as various hybrid mask types. An example of a programmable mirror array employs a matrix arrangement of small mirrors, each of which can be individually tilted so as to reflect an incoming radiation beam in different directions. The tilted mirrors impart a pattern in the radiation beam B which is reflected by the mirror matrix.

The term "projection system" PS can encompass any type of projection system, including refractive, reflective, catadioptric, magnetic, electromagnetic and electrostatic optical systems, or any combination thereof, as appropriate for the exposure radiation being used, or for other factors, such as the use of an immersion liquid or the use of a vacuum. A vacuum environment can be used for EUV or electron beam radiation since other gases can absorb too much radiation or electrons. A vacuum environment can therefore be provided to the whole beam path with the aid of a vacuum wall and vacuum pumps.

Lithographic apparatus 100 and/or lithographic apparatus 100' can be of a type having two (dual stage) or more substrate tables (and/or two or more mask tables) WT. In such "multiple stage" machines the additional substrate tables WT can be used in parallel, or preparatory steps can be carried out on one or more tables while one or more other substrate tables WT are being used for exposure. In lithographic apparatus 100, one or more movable parts of the apparatus can be provided with a pneumatic (e.g., air) bearing. For example, devices such as the substrate table WT, the mask table MT, and reticle handling devices can be supported with a pneumatic bearing.

Referring to FIGS. 1A and 1B, the illuminator IL receives a radiation beam from a radiation source SO. The source SO and the lithographic apparatuses 100, 100' can be separate entities, for example when the source SO is an excimer laser. In such cases, the source SO is not considered to form part of the lithographic apparatuses 100 or 100', and the radiation beam B passes from the source SO to the illuminator IL with the aid of a beam delivery system BD (FIG. 1B) comprising, for example, suitable directing mirrors and/or a beam expander. In other cases, the source SO can be an integral part of the lithographic apparatuses 100, 100'—for example when the source SO is a mercury lamp. The source SO and the illuminator IL, together with the beam delivery system BD, if required, can be referred to as a radiation system.

The illuminator IL can comprise an adjuster AD (FIG. 1B) for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL can comprise various other components (FIG. 1B), such as an integrator IN and a condenser CO. The illuminator IL can be used to condition the radiation beam B, to have a desired uniformity and intensity distribution in its cross section.

Referring to FIG. 1A, the radiation beam B is incident on the patterning device (e.g., mask) MA, which is held on the support structure (e.g., mask table) MT, and is patterned by the patterning device MA. In lithographic apparatus 100, the radiation beam B is reflected from the patterning device (e.g., mask) MA. After being reflected from the patterning device (e.g., mask) MA, the radiation beam B passes through the projection system PS, which focuses the radiation beam B onto a target portion C of the substrate W. With the aid of the second positioner PW and position sensor IF2 (e.g., an interferometric device, linear encoder or capacitive sensor), the substrate table WT can be moved accurately, e.g. so as to position different target portions C in the path of the radiation beam B. Similarly, the first positioner PM and another position sensor IF1 can be used to accurately position the patterning device (e.g., mask) MA with respect to the path of the radiation beam B. Patterning device (e.g., mask) MA and substrate W can be aligned using mask alignment marks M1, M2 and substrate alignment marks P1, P2.

Referring to FIG. 1B, the radiation beam B is incident on the patterning device (e.g., mask MA), which is held on the support structure (e.g., mask table MT), and is patterned by the patterning device. Having traversed the mask MA, the radiation beam B passes through the projection system PS, which focuses the beam onto a target portion C of the substrate W. With the aid of the second positioner PW and position sensor IF (e.g., an interferometric device, linear encoder or capacitive sensor), the substrate table WT can be moved accurately, e.g. so as to position different target portions C in the path of the radiation beam B. Similarly, the first positioner PM and another position sensor (which is not explicitly depicted in FIG. 1B) can be used to accurately position the mask MA with respect to the path of the radiation beam B, e.g., after mechanical retrieval from a mask library, or during a scan.

In general, movement of the mask table MT can be realized with the aid of a long-stroke module (coarse positioning) and a short-stroke module (fine positioning), which form part of the first positioner PM. Similarly, movement of the substrate table WT can be realized using a long-stroke module and a short-stroke module, which form part of the second positioner PW. In the case of a stepper (as opposed to a scanner) the mask table MT can be connected to a short-stroke actuator only, or can be fixed. Mask MA and substrate W can be aligned using mask alignment marks M1, M2 and substrate alignment marks P1, P2. Although the substrate alignment marks as illustrated occupy dedicated target portions, they can be located in spaces between target portions (known as scribe-lane alignment marks). Similarly, in situations in which more than one die is provided on the mask MA, the mask alignment marks can be located between the dies.

The lithographic apparatuses 100 and 100' can be used in at least one of the following modes:
1. In step mode, the support structure (e.g., mask table) MT and the substrate table WT are kept essentially stationary, while an entire pattern imparted to the radiation beam B is projected onto a target portion C at one time (i.e., a single static exposure). The substrate table WT is then shifted in the X and/or Y direction so that a different target portion C can be exposed.
2. In scan mode, the support structure (e.g., mask table) MT and the substrate table WT are scanned synchronously while a pattern imparted to the radiation beam B is projected onto a target portion C (i.e., a single dynamic exposure). The velocity and direction of the substrate table WT relative to the support structure (e.g., mask table) MT can be determined by the (de-)magnification and image reversal characteristics of the projection system PS.
3. In another mode, the support structure (e.g., mask table) MT is kept substantially stationary holding a programmable patterning device, and the substrate table WT is moved or scanned while a pattern imparted to the radiation beam B is projected onto a target portion C. A pulsed radiation source SO can be employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to herein.

Combinations and/or variations on the described modes of use or entirely different modes of use can also be employed.

Although specific reference can be made in this text to the use of lithographic apparatus in the manufacture of ICs, it should be understood that the lithographic apparatus described herein can have other applications, such as the manufacture of integrated optical systems, guidance and detection patterns for magnetic domain memories, flat-panel displays, liquid-crystal displays (LCDs), thin-film magnetic heads, etc. The skilled artisan will appreciate that, in the context of such alternative applications, any use of the terms "wafer" or "die" herein can be considered as synonymous with the more general terms "substrate" or "target portion," respectively. The substrate referred to herein can be processed, before or after exposure, in for example a track (a tool that typically applies a layer of resist to a substrate and develops the exposed resist), a metrology tool and/or an inspection tool. Where applicable, the disclosure herein can be applied to such and other substrate processing tools. Further, the substrate can be processed more than once, for example in order to create a multi-layer IC, so that the term substrate used herein can also refer to a substrate that already contains multiple processed layers.

In a further embodiment, lithographic apparatus 100 includes an extreme ultraviolet (EUV) source, which is configured to generate a beam of EUV radiation for EUV lithography. In general, the EUV source is configured in a radiation system (see below), and a corresponding illumination system is configured to condition the EUV radiation beam of the EUV source.

B. Example EUV Lithographic Apparatus

Figure 2:
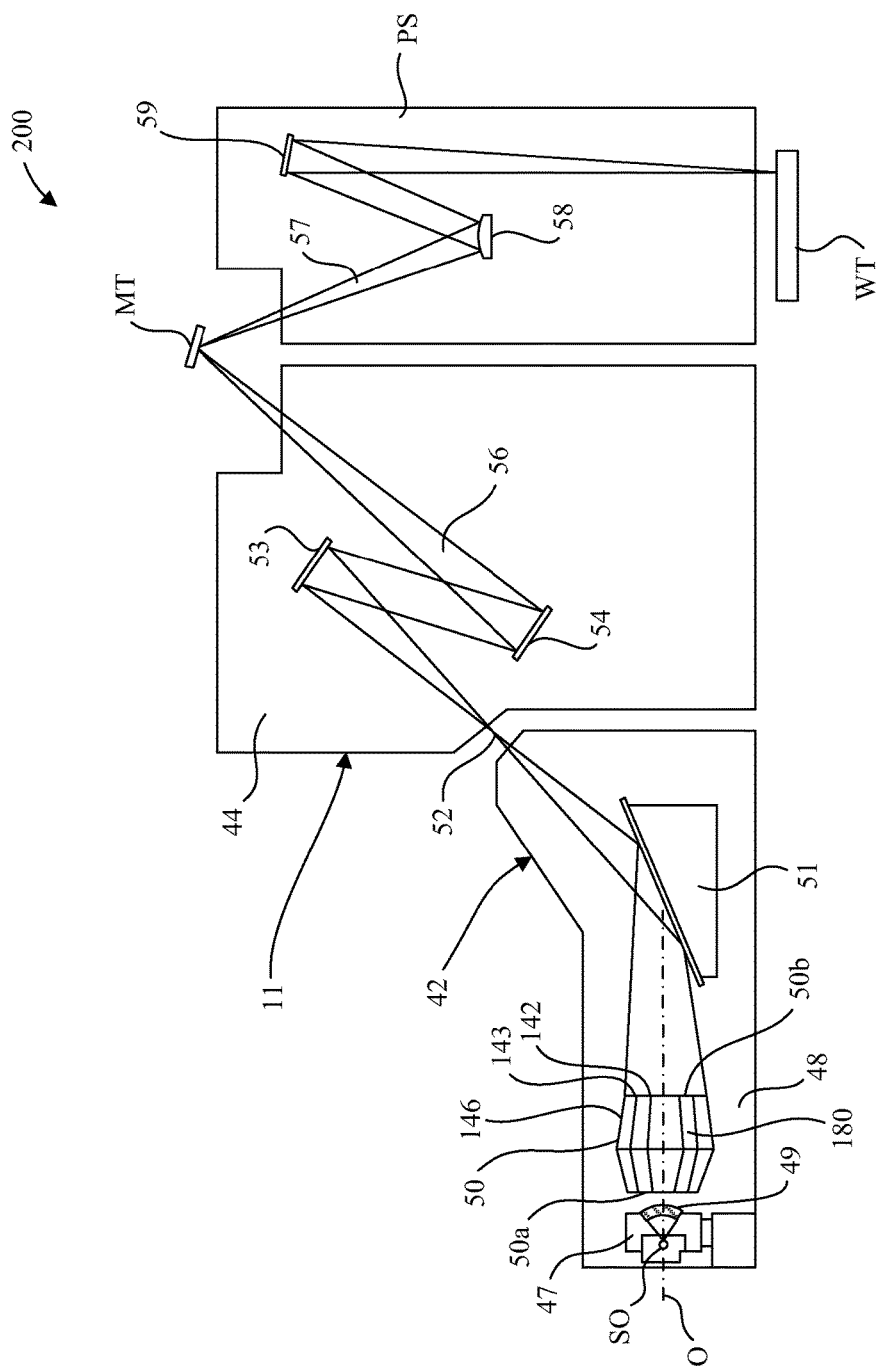
FIG. 2 depicts an exemplary EUV lithographic apparatus.

FIG. 2 schematically depicts an exemplary EUV lithographic apparatus 200 according to an embodiment of the present invention. In FIG. 2, EUV lithographic apparatus 200 includes a radiation system 42, an illumination optics unit 44, and a projection system PS. The radiation system 42 includes a radiation source SO, in which a beam of radiation can be formed by a discharge plasma. In an embodiment, EUV radiation can be produced by a gas or vapor, for example, from Xe gas, Li vapor, or Sn vapor, in which a very hot plasma is created to emit radiation in the EUV range of the electromagnetic spectrum. The very hot plasma can be created by generating at least partially ionized plasma by, for example, an electrical discharge. Partial pressures of, for example, 10 Pa of Xe, Li, Sn vapor or any other suitable gas or vapor can be required for efficient generation of the radiation. The radiation emitted by radiation source SO is passed from a source chamber 47 into a collector chamber 48 via a gas barrier or contaminant trap 49 positioned in or behind an opening in source chamber 47. In an embodiment, gas barrier 49 can include a channel structure.

Collector chamber 48 includes a radiation collector 50 (which can also be called collector mirror or collector) that can be formed from a grazing incidence collector. Radiation collector 50 has an upstream radiation collector side 50a and a downstream radiation collector side 50b, and radiation passed by collector 50 can be reflected off a grating spectral filter 51 to be focused at a virtual source point 52 at an aperture in the collector chamber 48. Radiation collectors 50 are known to skilled artisans.

From collector chamber 48, a beam of radiation 56 is reflected in illumination optics unit 44 via normal incidence reflectors 53 and 54 onto a reticle or mask (not shown) positioned on reticle or mask table MT. A patterned beam 57 is formed, which is imaged in projection system PS via reflective elements 58 and 59 onto a substrate (not shown) supported on wafer stage or substrate table WT. In various embodiments, illumination optics unit 44 and projection system PS can include more (or fewer) elements than depicted in FIG. 2. For example, grating spectral filter 51 can optionally be present, depending upon the type of lithographic apparatus. Further, in an embodiment, illumination optics unit 44 and projection system PS can include more mirrors than those depicted in FIG. 2. For example, projection system PS can incorporate one to four reflective elements in addition to reflective elements 58 and 59. In FIG. 2, reference number 180 indicates a space between two reflectors, e.g., a space between reflectors 142 and 143.

In an embodiment, collector mirror 50 can also include a normal incidence collector in place of or in addition to a grazing incidence mirror. Further, collector mirror 50, although described in reference to a nested collector with reflectors 142, 143, and 146, is herein further used as example of a collector.

Further, instead of a grating 51, as schematically depicted in FIG. 2, a transmissive optical filter can also be applied. Optical filters transmissive for EUV, as well as optical filters less transmissive for or even substantially absorbing UV radiation, are known to skilled artisans. Hence, the use of "grating spectral purity filter" is herein further indicated interchangeably as a "spectral purity filter," which includes gratings or transmissive filters. Although not depicted in FIG. 2, EUV transmissive optical filters can be included as additional optical elements, for example, configured upstream of collector mirror 50 or optical EUV transmissive filters in illumination unit 44 and/or projection system PS.

The terms "upstream" and "downstream," with respect to optical elements, indicate positions of one or more optical elements "optically upstream" and "optically downstream," respectively, of one or more additional optical elements. Following the light path that a beam of radiation traverses through lithographic apparatus 200, a first optical elements closer to source SO than a second optical element is configured upstream of the second optical element; the second optical element is configured downstream of the first optical element. For example, collector mirror 50 is configured upstream of spectral filter 51, whereas optical element 53 is configured downstream of spectral filter 51.

All optical elements depicted in FIG. 2 (and additional optical elements not shown in the schematic drawing of this embodiment) can be vulnerable to deposition of contaminants produced by source SO, for example, Sn. Such can be the case for the radiation collector 50 and, if present, the spectral purity filter 51. Hence, a cleaning device can be employed to clean one or more of these optical elements, as well as a cleaning method can be applied to those optical elements, but also to normal incidence reflectors 53 and 54 and reflective elements 58 and 59 or other optical elements, for example additional mirrors, gratings, etc.

Radiation collector 50 can be a grazing incidence collector, and in such an embodiment, collector 50 is aligned along an optical axis O. The source SO, or an image thereof, can also be located along optical axis O. The radiation collector 50 can comprise reflectors 142, 143, and 146 (also known as a "shell" or a Wolter-type reflector including several Wolter-type reflectors). Reflectors 142, 143, and 146 can be nested and rotationally symmetric about optical axis O. In FIG. 2, an inner reflector is indicated by reference number 142, an intermediate reflector is indicated by reference number 143, and an outer reflector is indicated by reference number 146. The radiation collector 50 encloses a certain volume, i.e., a volume within the outer reflector(s) 146. Usually, the volume within outer reflector(s) 146 is circumferentially closed, although small openings can be present.

Reflectors 142, 143, and 146 respectively can include surfaces of which at least portion represents a reflective layer or a number of reflective layers. Hence, reflectors 142, 143, and 146 (or additional reflectors in the embodiments of radiation collectors having more than three reflectors or shells) are at least partly designed for reflecting and collecting EUV radiation from source SO, and at least part of reflectors 142, 143, and 146 can not be designed to reflect and collect EUV radiation. For example, at least part of the back side of the reflectors can not be designed to reflect and collect EUV radiation. On the surface of these reflective layers, there can in addition be a cap layer for protection or as optical filter provided on at least part of the surface of the reflective layers.

The radiation collector 50 can be placed in the vicinity of the source SO or an image of the source SO. Each reflector 142, 143, and 146 can comprise at least two adjacent reflecting surfaces, the reflecting surfaces further from the source SO being placed at smaller angles to the optical axis O than the reflecting surface that is closer to the source SO. In this way, a grazing incidence collector 50 is configured to generate a beam of (E)UV radiation propagating along the optical axis O. At least two reflectors can be placed substantially coaxially and extend substantially rotationally symmetric about the optical axis O. It should be appreciated that radiation collector 50 can have further features on the external surface of outer reflector 146 or further features around outer reflector 146, for example a protective holder, a heater, etc.

In the embodiments described herein, the terms "lens" and "lens element," where the context allows, can refer to any one or combination of various types of optical components, comprising refractive, reflective, magnetic, electromagnetic and electrostatic optical components.

Further, the terms "radiation" and "beam" used herein encompass all types of electromagnetic radiation, comprising ultraviolet (UV) radiation (e.g., having a wavelength λ, of 365, 248, 193, 157 or 126 nm), extreme ultra-violet (EUV or soft X-ray) radiation (e.g., having a wavelength in the range of 5-20 nm, e.g., 13.5 nm), or hard X-ray working at less than 5 nm, as well as particle beams, such as ion beams or electron beams. Generally, radiation having wavelengths between about 780-3000 nm (or larger) is considered IR radiation. UV refers to radiation with wavelengths of approximately 100-400 nm. Within lithography, it is usually also applied to the wavelengths, which can be produced by a mercury discharge lamp: G-line 436 nm; H-line 405 nm; and/or I-line 365 nm. Vacuum UV, or VUV (i.e., UV absorbed by air), refers to radiation having a wavelength of approximately 100-200 nm. Deep UV (DUV) generally refers to radiation having wavelengths ranging from 126 nm to 428 nm, and in an embodiment, an excimer laser can generate DUV radiation used within lithographic apparatus. It should be appreciated that radiation having a wavelength in the range of, for example, 5-20 nm relates to radiation with a certain wavelength band, of which at least part is in the range of 5-20 nm.

III. Improved Pneumatic Bearing

A. Flat Pneumatic Bearing Having a Bonded Polymer Film Wear Surface

Figure 3:
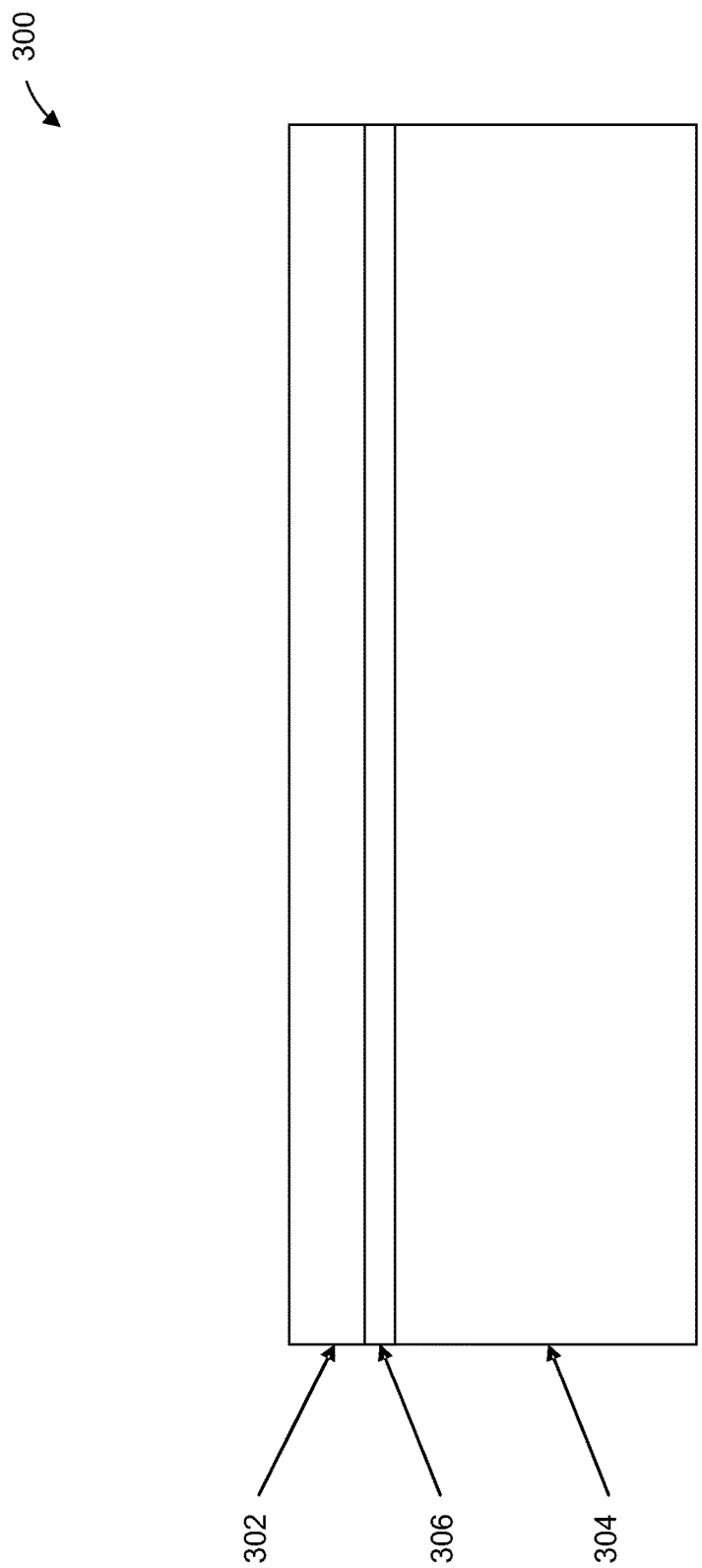
FIG. 3 depicts an exemplary pneumatic bearing with a bonded polymer film wear surface, according to the present invention.

FIG. 3 depicts an exemplary pneumatic bearing 300 with a bonded polymer film wear surface, according to the present invention. As part of the pneumatic bearing 300, a polyimide film 302 is permanently bonded to a substrate 304 by a bonding agent 306. The pneumatic air bearing 300 can be used in a lithographic tool, such as the aforementioned lithographic apparatus 100, 100'. For example, the substrate 304 can support a payload as a part of a reticle handling device that is a part of the aforementioned lithographic apparatus 100, 100'.

The polyimide film 302 is a tough and durable polymer film. The preferred polyimide film 302 is poly-oxydiphenylene-pyromellitimide, manufactured in film format by DuPont and sold under the trade name Kapton®. In an example, the polyimide film 302 thickness is in a range from 7-100 microns, and preferably at least 25 microns.

The preferred bonding agent 306 is a low viscosity, two-part, room-temperature-cure epoxy, such as diglycidyl ether of bisphenol A, 1,4-butanediol diglycidyl ether, and 2,2,4-trimetylhexametylen-1,6-diamin, sold under the trade name Epo-tek® 301-2 epoxy.

The substrate 304 has a non-hardened surface, so a tough and durable polymer film is bonded to the non-hardened substrate in order to create a bearing surface. Thus, an opposing bearing surface can be left in its natural, low-strain, non-hardened condition. The substrate 304 can be metal, for example, stainless steel, and the opposing surface can be a similar or dissimilar material, for example, stainless steel. The choice of materials for the substrate 304 also includes other materials that are favorable for attaining a high degree of flatness, for example, glasses and ceramics, as would become apparent to a person having ordinary skill in the art. In an non-limiting example, the substrate 304 is approximately ten millimeters thick and approximately three hundred millimeters in diameter, with a surface flatness of approximately three to approximately six microns peak-to-valley across a useful surface of the substrate 304.

Figure 4:
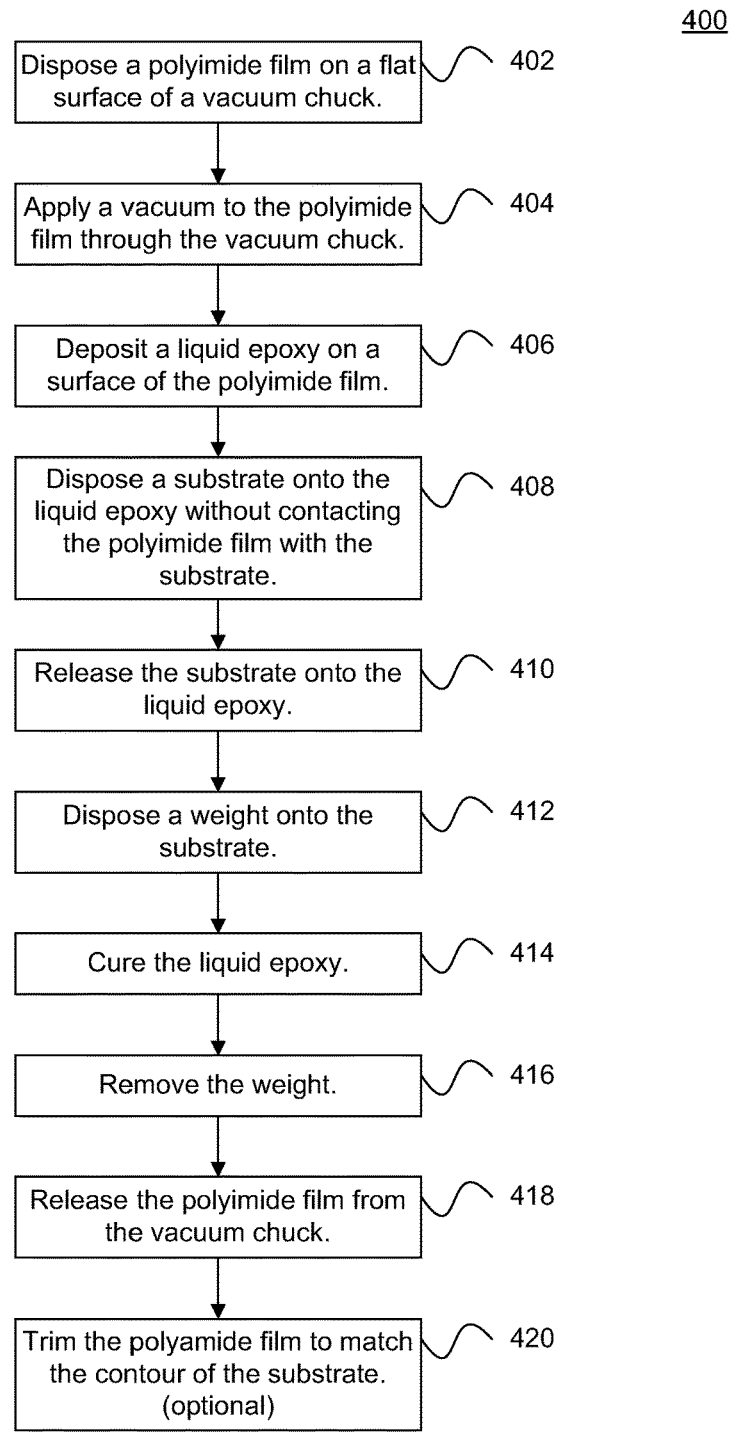
FIG. 4 is a flowchart of an exemplary method for manufacturing a pneumatic bearing with a bonded polymer film wear surface, according to the present invention.

B. Methods for Manufacturing a Flat Pneumatic Bearing having a Bonded Polymer Film Wear Surface FIG. 4 is a flowchart of an exemplary method 400 for manufacturing a pneumatic bearing, with a bonded polymer film wear surface, such as the pneumatic bearing 300. Further, FIGS. 5A to 5G depict different phases of the exemplary manufacturing method illustrated in FIG. 4. In particular, FIGS. 5A to 5G depict, in cross-section, manufacture of an exemplary annular-shaped pneumatic bearing with a bonded polymer film wear surface. The method 400 described can be used to manufacture the pneumatic bearing 300, with a bonded polyimide film 302 wear surface that is square, rectangular, annular, or any other useful shape. Following this method 400, the flatness of the surface of the polyimide film 302 can be made to be better than the flatness of the substrate 304, and sufficiently flat to be useful as an air bearing. This enables production of a useful, flat film surface at a relatively low cost because the substrate 304 requires less precise machining. As an additional benefit, no post-machining of the surface of the polyimide film 302 post-bonding is needed to achieve a useful degree of flatness. The method 400 can be performed in a clean room to reduce a possibility of debris contaminating a surface of the substrate 306.

Figure 5A:
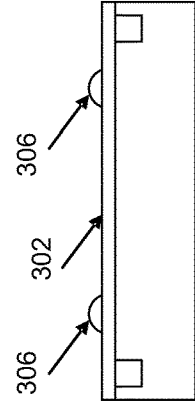
FIGS. 5A to 5G illustrate an exemplary method for manufacturing a pneumatic bearing with a bonded polymer film wear surface, according to the present invention.

In step 402, vacuum chuck 502 having a very flat and well-polished surface is provided, as depicted in FIG. 5A. The flatness of the vacuum chucks 502 flat surface determines the surface flatness of the polyimide film 302 at the conclusion of the manufacturing process. A higher degree of flatness reduces the probability of a dry sliding occurring, and increases uniformity of gas pressure between bearing surfaces and guideways during bearing operation. The vacuum chuck 502 can have a flatness over its entire useful surface of approximately two microns peak-to-valley.

The flat surface of the vacuum chuck 502 is positioned perpendicular (e.g., level) with respect to gravity to keep the substrate 304 from sliding relative to the polyimide film 302 in steps 408-414. Then, the polyimide film 302 is placed on the flat surface of the vacuum chuck 502.

Figure 5B:
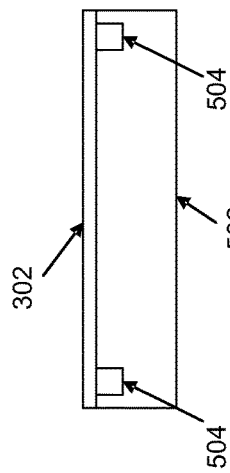

In step 404, depicted in FIG. 5B, a vacuum is applied to the polyimide film 302 through a vacuum port 504, which can be a circular groove, for example. This causes the polyimide film 302 to substantially conform to the flat surface of the vacuum chuck 502. This technique provides a finished bearing with a useful, flat bearing surface, without requiring surface finishing of the polyimide film 302.

Figure 5C:
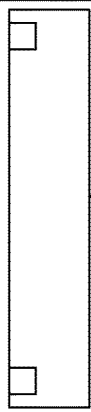

In step 406, depicted in FIG. 5C, a premixed and degassed liquid epoxy 306 is poured onto, or otherwise disposed or applied to, the polyimide film 302, for example, in a shape of a single continuous curve. The applied epoxy 306 can have a thickness of 4-5 mm. For an annular substrate, the curve is closed. For a rectangular substrate, the epoxy 306 can be applied in a shape of a line, and for a round or square substrate, the epoxy 306 can be applied in a shape of a dot. The shape of the applied epoxy 306 is chosen depending on the shape of the substrate 304, in order to avoid entrapment of air between the substrate 304 and the polyimide film 302 in the subsequent steps. FIGS. 5D through 5G depict a ring-shaped substrate 304 as an example of a shape of the substrate 304. Following application of the epoxy 306 to the polyimide film 302, this assembly can be left to sit for a period of time during which gravity will smooth the distribution of the epoxy 306 on the polyimide film 302. During this time, any gasses entrained in the epoxy can also escape.

Figure 5D:
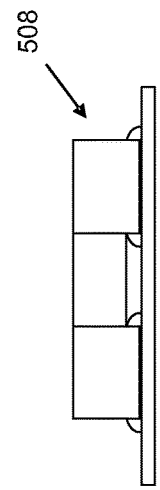

In step 408, depicted in FIG. 5D, the substrate 304 is disposed (e.g., lowered) onto the epoxy 306. In an example, the substrate 304 is always maintained level (by external means) with respect to gravity throughout a slow lowering motion. This keeps the epoxy 306 from being unevenly distributed between substrate 304 and the polyimide film 302. Other schemes to dispose the substrate 304 onto the epoxy 306, that are more complicated than using gravity, may be employed, as would become apparent to a person having ordinary skill in the art.

In step 410, the substrate 304 is released in a controlled manner and allowed to settle on both the polyimide film 302 and the epoxy 306. In an example, the substrate 304 is released when the distance between the substrate 304 and the polyimide film 302 is approximately 0-1 mm from the surface of the epoxy 306, and preferably about 0.5 mm.

Figure 5E:
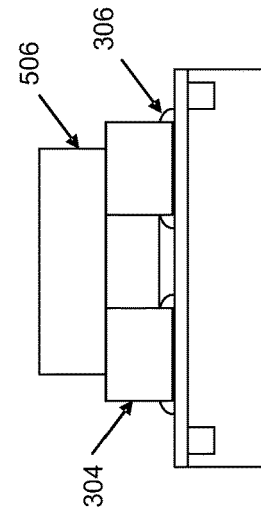

In step 412, depicted in FIG. 5E, a weight 506 can be disposed (e.g., placed) on top of the substrate 304, to apply a force (e.g., gravity) to the substrate 304 which squeezes out any excess epoxy 306. In step 414, the epoxy 306 is allowed to cure, as prescribed by the epoxy manufacturer.

Figure 5F:
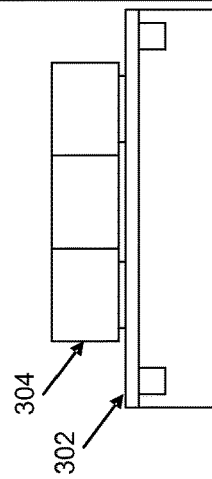

In step 416, depicted in FIG. 5F, the weight 506 is removed. In step 418, the partially finished bearing 508 is released from the vacuum chuck 502. Optionally, compressed gas can be injected through the vacuum port 504 to facilitate removal.

Figure 5G:
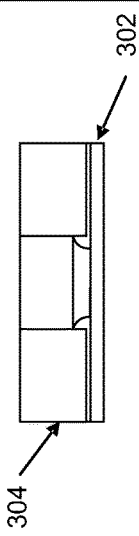

In step 420, depicted in FIG. 5G, an edge of the polyimide film 302 is trimmed to match a contour of the substrate 304. Trimming may be accomplished by many techniques, as would become apparent to a person having ordinary skill in the art. The polyimide film 302 requires no surface grinding to improve its surface flatness, and no heat treatment to improve its hardness.

Figure 6:
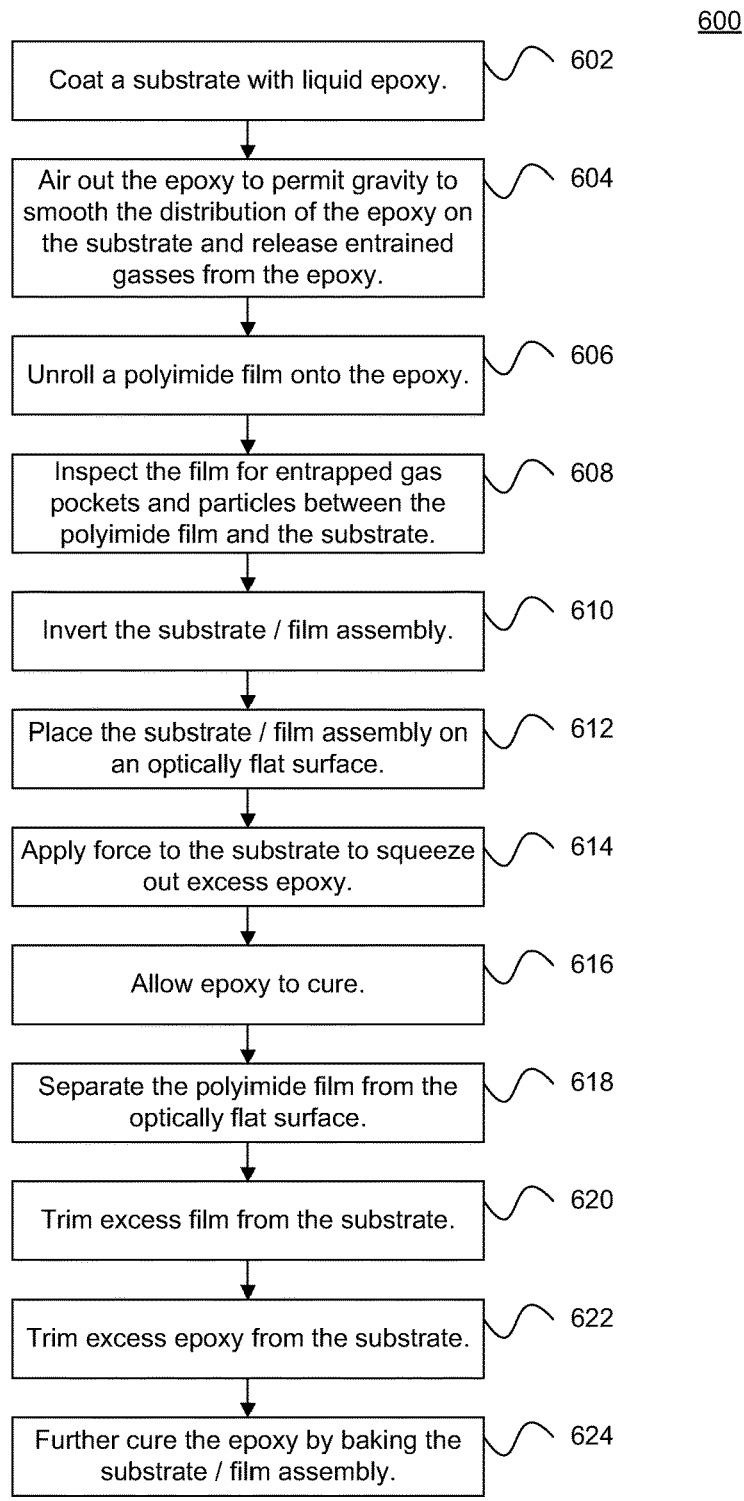
FIG. 6 is a flowchart of another exemplary method for manufacturing a pneumatic bearing, with a bonded polymer film wear surface, according to the present invention.

FIG. 6 is a flowchart of an exemplary method 600 for manufacturing a pneumatic bearing, with a bonded polymer film wear surface, such as the pneumatic bearing 300. The method 600 described can be used to manufacture the pneumatic bearing 300 with a bonded polyimide film 302 wear surface that is square, rectangular, annular, or any other useful shape. Following this method 600, the flatness of the surface of the polyimide film 302 can be made to be better than the flatness of the substrate 304, and sufficiently flat to be useful as an air bearing. This enables production of a useful, flat film surface at a relatively low cost because the substrate 304 requires less precise machining. As an additional benefit, no post-machining of the surface of the polyimide film 302 post-bonding is needed to achieve a useful degree of flatness. The method 600 can be performed in a temperature-controlled clean room to reduce a possibility of debris contaminating a surface of the substrate 304.

In step 602, the substrate 304 is coated with liquid epoxy 306. The coating can provide a substantially uniform layer of epoxy 306 that is at least 100 microns thick.

In step 604 the epoxy 306 is aired out to permit gravity to smooth the distribution of the epoxy 306 on the substrate 304, and to release entrained gasses from the epoxy 306. In a non-limiting example, airing out takes approximately ten minutes.

In step 606, a polyimide film 302 is unrolled onto the epoxy 306. Surface tension of the epoxy 306 slowly pulls the polyimide film 302 to the substrate 304. No external force need be applied to force contact between the polyimide film 302 and the epoxy 306.

In step 608, the polyimide film 302 is inspected for gas pockets and particles trapped between the polyimide film 302 and the substrate 304. Any trapped gasses can be forced through the epoxy 306 toward a portion of the epoxy 306 that is exposed to the atmosphere, and subsequently expelled from the epoxy 306.

In step 610, the substrate/film assembly is inverted. If the substrate 304 has an annular shape, a vent is cut in the center of the polyimide film 302. This vent is subsequently used to transfer gas across the polyimide film 302 during the manufacturing process.

In step 612, the substrate/film assembly is placed on an optically flat surface, such as the vacuum chuck 502. During placement, tilting of the substrate/film assembly is minimized. After placement, the polyimide film 302 is in contact with the optically flat surface.

In step 614, force is applied to the substrate 304 to squeeze out excess epoxy 306. A weight can be applied to the substrate 304 to provide the force. The vent formed in step 610 will release any gas trapped between the polyimide film 302 and the optically flat surface. During application of the force, the polyimide film 302 and the substrate 304 can be constrained coplanar to the optically flat surface to prevent the substrate 304 and polyimide film 302 from sliding relative to each other on the epoxy 306.

In step 616, the epoxy 306 is allowed to cure. In a non-limiting example, the cure time is approximately 48 hours.

In step 618, the polyimide film 302 is separated from the optically flat surface. Compressed gas can be injected into the vent provided in step 610 to break any surface tension between the polyimide film 302 and the optically flat surface.

In step 620, excess polyimide film 302 is trimmed from the substrate. In step 622, excess epoxy 306 is trimmed from the substrate. Trimming may be accomplished by many techniques, as would become apparent to a person having ordinary skill in the art. The polyimide film 302 requires no surface grinding to improve its surface flatness, and no heat treatment to improve its hardness.

In step 624, the epoxy 306 is further cured by baking the substrate/film assembly. In an non-limiting example, the substrate/film assembly is baked at 120 degrees Celsius for twelve hours. The baking can take place in a vacuum chamber.

IV. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A pneumatic bearing for use in a reticle handling system of a lithography tool, comprising:
   a flat pneumatic bearing substrate configured to support a payload;
   a bonding layer disposed on the pneumatic bearing substrate; and
   a polymer film disposed on the bonding layer,
   wherein the pneumatic bearing is further configured to deliver compressed gas to create a consistent gas film upon which the payload rests and/or moves.

2. The pneumatic bearing of claim 1, wherein the flat pneumatic bearing substrate is made from a material selected from the group consisting of metals, glass, and ceramics.

3. The pneumatic bearing of claim 1, wherein the bonding layer comprises diglycidyl ether of bisphenol A; 1,4-butanediol diglycidyl ether; and 2,2,4-trimetylhexametylen-1,6-diamin.

4. The pneumatic bearing of claim 1, wherein the polymer film comprises poly-oxydiphenylene-pyromellitimide.

5. The pneumatic bearing of claim 1, wherein the polymer film is at least 25 microns thick.

6. The pneumatic bearing of claim 1, wherein the polymer film is between seven to one hundred microns thick.

* * * * *